United States Patent
Kosmatka et al.

(10) Patent No.: US 11,611,635 B1
(45) Date of Patent: Mar. 21, 2023

(54) CONTENT CREATION UTILIZING MICRO-SERVICES

(71) Applicant: Amazon Technologies, Inc., Seattle, WA (US)

(72) Inventors: Kristopher Kosmatka, Portland, OR (US); Saurav Sengupta, Beaverton, OR (US); Evan Statton, Denver, CO (US); Lionel Bringuier, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 489 days.

(21) Appl. No.: 16/455,612

(22) Filed: Jun. 27, 2019

(51) Int. Cl.
H04L 67/60 (2022.01)
G06F 7/14 (2006.01)
H04L 65/61 (2022.01)

(52) U.S. Cl.
CPC ............... *H04L 67/60* (2022.05); *G06F 7/14* (2013.01); *H04L 65/61* (2022.05)

(58) Field of Classification Search
CPC ........ H04L 67/32; H04L 65/4069; G06F 7/14
See application file for complete search history.

(56) References Cited

U.S. PATENT DOCUMENTS

| | | | |
|---|---|---|---|
| 10,757,467 B1* | 8/2020 | Katz | H04L 65/401 |
| 2008/0112690 A1* | 5/2008 | Shahraray | H04N 21/47 386/262 |
| 2010/0094961 A1* | 4/2010 | Zuckerman | H04L 67/1097 709/219 |
| 2014/0143437 A1* | 5/2014 | Mathur | H04N 21/6581 709/231 |
| 2015/0050998 A1* | 2/2015 | Stelovsky | A63F 13/79 463/31 |
| 2015/0215654 A1* | 7/2015 | Kim | H04N 21/25866 725/93 |
| 2017/0200471 A1* | 7/2017 | Gilson | G10L 21/055 |
| 2018/0270122 A1* | 9/2018 | Brown | H04L 67/30 |
| 2019/0090023 A1* | 3/2019 | Lee | H04N 21/8456 |

\* cited by examiner

*Primary Examiner* — Nicholas R Taylor
*Assistant Examiner* — Tania M Pena-Santana
(74) *Attorney, Agent, or Firm* — Knobbe, Martens, Olson & Bear, LLP (57) ABSTRACT

The disclosure herein pertains to a content creation service utilizing micro-services. The content creation service divides up the tasks for content creation including extracting a start portion, a stop portion, and merging the stop portion, start portion, and segments between the start portion and the stop portion. The content creation service utilizes micro-services in order to perform the tasks. Advantageously, use of micro-services allow for improved scalability and faster processing.

26 Claims, 6 Drawing Sheets

CONTENT CREATION UTILIZING MICRO-SERVICES

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a content delivery service provider. As with content providers, content delivery service providers also provide requested content to client computing devices often with consideration of efficient transmission of the requested content to the client computing device and/or consideration of a cost associated with the transmission of the content. Content delivery service provider can also integrate supplemental content, such as advertisement content, in streaming content embodiments.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present application correspond to content delivery. More specifically, one or more aspects of the present application corresponds to systems and method for supporting the dynamic generation of content responsive to individual requests, such as requests from users or network-services. Streaming content is generally divided up into a set of segments that are transmitted to user devices. In some scenarios, users receiving streaming content may request or define subsets of the streamed content, such as a replay of a portion of a sporting event. In other embodiments, network services can attempt to generate clips or portions of the streamed content, such as highlights of a sporting event. The present application pertains to a content creation service which processes content requests, and using defined workflows, causes the execution of a set of distributed micro-services to dynamically process the content requests and generate content. Illustratively, individual workflows define the specific tasks or sub-tasks that will be implemented to generate responsive content. The individual workflows may be customized such that a management component may implement a different set of micro-services based on individual requests (e.g., receiving two requests to create the same content but adding an encryption task to one of the requests). Substantially overlapping content requests may be share one or more tasks in common, which in some embodiments, allows the management component to utilize the same processing result from an individual micro-service for two or more content requests (e.g., sharing the creation of a new start segment based on content requests having a common start time.

Individual micro-services illustratively can correspond to a computing component or environment that can be accessed to implement one or more tasks or sub-tasks related to the generation of content. The micro-services can relate to fully implemented components or services that are configured to implement tasks, such as processing previously encoded content segments to generate a start segment or a stop segment forming the start and end points of the requested content or gathering a set of encoded segments that fall in between the start and stop segments to complete the full set of encoded segments making up the requested content. In other embodiments, the individual micro-services can correspond to more dynamic computing environments that can receive and execute code in a manner to achieve the assigned task or sub-task. Such dynamic computing environments may not persist after the execution of the code and completion of the task(s). The micro-services may be uniquely configured in accordance with specific computing resources or applications to perform a specific task, such as content encoding or re-encoding, encryption, compression, or other forms of processing. Some portions of the micro-services may be more generic that facilitate processing multiple tasks, such as a single micro-service that can generate a start segment and a stop segment. Additionally, the micro-services may be implemented as virtualized components that make instantiation of particular micro-services, such as processing start segments, stop segments, gathering segments, or merging segments (as described herein) scalable to handle multiple content requests in parallel. Such can approach can improve scalability and speed up processing content requests.

In some embodiments, to deliver content, content providers can organize requested content, such as a video file, into multiple segments that are then transmitted to requesting devices, segment by segment. For example, in a video stream, each segment typically accounts for 2-10 seconds of video rendered on a receiving device. To provide content to the content delivery service, individual content segments can be encoded by an encoder and transmitted to the video and origination service. Traditionally, a single processing node on the content delivery service can receive an incoming stream of encoded segments or original encoded content for further processing.

Video segments can be encoded according to a defined bitrate and format, which generally defines the number of bits of data that are encoded over a measured amount of time and the specific software algorithm and resulting content representation format utilized to encode the data for transmission. For video files, bitrates are typically measured according to how many kilobits or megabits of data are processed over a second of time. By way of example, a data file that corresponds to 1 megabyte of video data encoded in one second would be considered to have an encoding bitrate of 8 mbps (e.g., 8 megabits per second) while a lower definition video file that corresponds to 45 kilobytes of video data processed in one second would be considered to have an encoding bitrate of 360 kbps (e.g., 360 kilobits per second).

It may be possible for the content provider to facilitate variable bit rate encoding to enable for variances in the encoding bitrates of individual segments of a video file. In such embodiments, the content provider can generate multiple encoded bitrate versions or combinations of encoded bitrates and formats of individual video file segments. The content provider can then make at least a subset of the multiple bitrate encoded versions available to clients responsive to a request for a particular encoded bitrate version and format. Generally, a content provider can generate a catalog identifying the video segments and encoded bitrates for each identified video segment. The catalog can be written into a manifest file that is provided to individual client computing devices that have requested the video file. Thereafter, once all the versions of an encoded segment are received by the packaging and origination service, the packaging and origination service is available to receive and process requests for encoded content. More specifically, client computing devices, through a respective software application, can request individual video segments according to the available encoded bitrates and formats as published in the manifest file.

To receive content, a client computing device can simply request content having a fixed encoding rate or have a fixed encoding rate selected in response to a streaming content request. Such a fixed encoding rate approach can be deficient in facilitating variance of the encoding bitrate (both positive and negative) based on factors, such as network bandwidth, client computing device utilization, quality demands, and the like. In addition to the association of the encoding bitrate, video segments can be further defined by associating the encoding bitrate with the encoding format utilized by the encoder to generate the output stream. The encoding format can correspond to a content representation format for storage or transmission of video content (such as in a data file or bitstream). Examples of encoding formats include but not limited to the motion pictures expert group ("MPEG) MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like.

Traditionally, content delivery services can maintain a one or more nodes or servers, e.g., an ingress node, to receive incoming encoded content streams and decode the source encoded content. More specifically, the single node can operate as an ingress node to receive individual content streams or channels corresponding to source encoded segments encoded to a specific encoding profile (e.g., encoding bitrate and format). The individual content streams or channels are provided by an original content provider. The ingress node can utilize state information that facilitates determination that all encoding versions of the same encoded segment have been received.

To support adaptive bitrate encoding or streaming, the ingress node decodes the source encoded content into an unencoded format. Thereafter, the unencoded content is encoded by one or more nodes or servers functioning as egress nodes, or encoders, that can process the decoded source content into one or more of the encoded content versions that will be available to requesting users. When a single node or server implements the functionality of both an ingress and egress node, the node can be referred to as a transcoding node that decoders incoming encoded content and generates one or more encoded content formats from the decoded original encoded content signal. Accordingly, reference to transcoding functionality can include decoding encoded original content, encoding previously decoded original content, or a combination thereof.

Content providers generate video responsive to individual user requests through video streaming channels. The streamed video is broken up according to the type of streaming protocol and into multiple segments that are then individually transmitted and processed at a client. The content provider has encoders that encode the content according to a bitrate and format and then stores the segments. The segments are then copied and addressed by individual streaming servers that establish a channel within the individual users. The client can then transmit requests to the content provider to generate clips or portions of the streamed content. The requested content clips may be based on time definitions, which do not necessarily line up to the segments.

In some embodiments, it may be possible that the content provider can support the generation of custom content or the generation of portions of streamed content. Conventionally, a single monolithic component performed content generation functionality. Utilization of monolithic components have many inefficiencies and deficiencies. For example, such a single monolithic component requires a large amount of resources and configurations to implement all the sub-tasks required to generate content. Each individual sub-task may not require the same type of resource or configuration of common resources. In another example, a single, monolithic component can be subject to processing inefficiencies in content creation for some portions of the content creation process, which can lead to overall delays and latencies in the performance of the monolithic component. In still a further example, a single, monolithic component does not scale well in environments with thousands or millions of users. Typically, the single, monolithic component processes multiple requests in a sequence in which the requests are received. This creates scenarios in which receipt of a series of requests create processing latencies as the single, monolithic component sequentially queues and processes requests. In yet another example, a single, monolithic component is often not optimized for customization of individual subtasks, which can vary according to content types (e.g., different video analysis services based on the type of encoding or encryption).

To address at least a portion of the above-described deficiencies, one or more aspects of the present application correspond to a micro-service based content creation service. One illustrative embodiment includes a management component which identifies and divides up the tasks that can be implemented by micro-services. Illustratively, microservices include a set of independent controllable services that are configured individually to executed tasks or steps associated with the dynamic generation of content. As described above, individual micro-services can be implemented as customized components or services that are accessible to the management, including but not limited to, virtualized computing components configured to implement individual or sets of tasks or dynamic computing environments that are not pre-configured to implement any particular tasks but can receive executable code that implements a desired task. The set of micro-services can illustratively including one or more micro-services that implement the creation of a start segment corresponding to the requested content, one or more micros-services that implement the creation of a stop segment corresponding to the requested content, one or more micro-services that implement the gathering of segments in between a start segment and a stop segment to form the completed set of encoded segments, one or more micro-services that implement the merging of the collected encoded segments, or one or more micro-services that implement some form of additional processing, such as re-encoding, encryption, watermarking, compression, and the like. However, reference to micro-service or micro-services is not limited to any particular computing environment or execution environment and can include any computing environment that can be assigned a task associated with workflow or identification of tasks.

To generate content by executing tasks, the content delivery will implement workflows or processes for identifying the set of micro-services that will implement one or more tasks defined in the workflow or process. The workflow can illustratively specify content creation based on a type of content, content publisher, user, or other selection criteria. The workflow can specify configuration information for identifying, selecting, or configuring individual micro-services including performance parameters/thresholds, financial criteria, security parameters/thresholds, and the like. For example, a content delivery service may attribute a financial cost associated with instantiated virtual machine instances functioning as a micro-service that can be configured to implement one or more tasks. The workflows may be preconfigured or dynamically modified such as through an API. Still further, the workflows may be updated based on performance metrics of the content delivery service.

The management component receives a content creation request which includes the relevant content information, a start time and a stop time. The management component can load a relevant workflow or set of steps which are editable or selectable. The management component identifies the relevant start segment and stop segment. Illustratively, the content utilized to generate the requested content can be organized into content segments that are configured for streaming, such as a sequence of content segments in which each individual segment is formed into six second segments. If the requested content requests start time or stop time falls within a particular segment (e.g., in the middle of a six second segment), the management component can process the previously generated content segments to extract the start or stop segments as necessary. The management component identifies a set of micro-services which can extract a start portion which includes the start time of the start segment to the end of the start segment. The management component causes a micro-service in the set of micro-services to extract the start portion. In some examples, the management component selects or identifies the micro-service in the set of micro-services based on criteria of each of the micro-services of the set of micro-services. These criteria include resources, cost, transmission time, processing power, and energy consumption.

The management component further identifies a set of micro-services which can be used to extract a stop portion which includes beginning of the stop segment to the end of the stop segment. The management component causes a micro-service of the set of micro-services to extract the stop portion Like selecting a micro-service for the start segment, the management component can select the micro-service of the set of micro-services based on criteria of each of the micro-services of the set of micro-services. The management component then gathers the segments that form the content in-between the identified start segment and stop segment. The management component can communicate with the original content provider itself to gather the segments or alternatively can cause a micro-service to perform the task of gathering the segments that have been previously stored by the content delivery service. The management component merges the start portion, stop portion, and the segments between the start segment and stop segment. The management component can merge the start portion, the stop portion, and the segments between the start segment and stop segment itself or alternatively can cause a micro-service to perform this task.

In addition to the processing of individual content requests, as identified above, other aspects of the present application facilitate the processing of multiple content requests in a manner that does not require sequential processing of content requests. In some embodiments, the management component can receive multiple requests from a single device or a set of devices. Rather the requiring the queueing of the content requests and sequentially processing each content request individually (e.g., a dependent processing of content requests), the management service can utilize the workflows to identify a set of micro-services to generate the requested content and cause the instantiation/implementation of the micro-services substantially in parallel or independent content request processing. The management service can utilize common portions of the processing for some content requests (e.g., content requests having a common stop segment), common micro-service for implementing one or more tasks (e.g., a specialized virtual machine instance that is preconfigured to gather encoded segments), or select non-overlapping micro-services to enable independent processing of the content requests (e.g., selecting different virtual machine instances that are configured to implement a micro-service so that the requests can be processed substantially in parallel).

Figure 1:
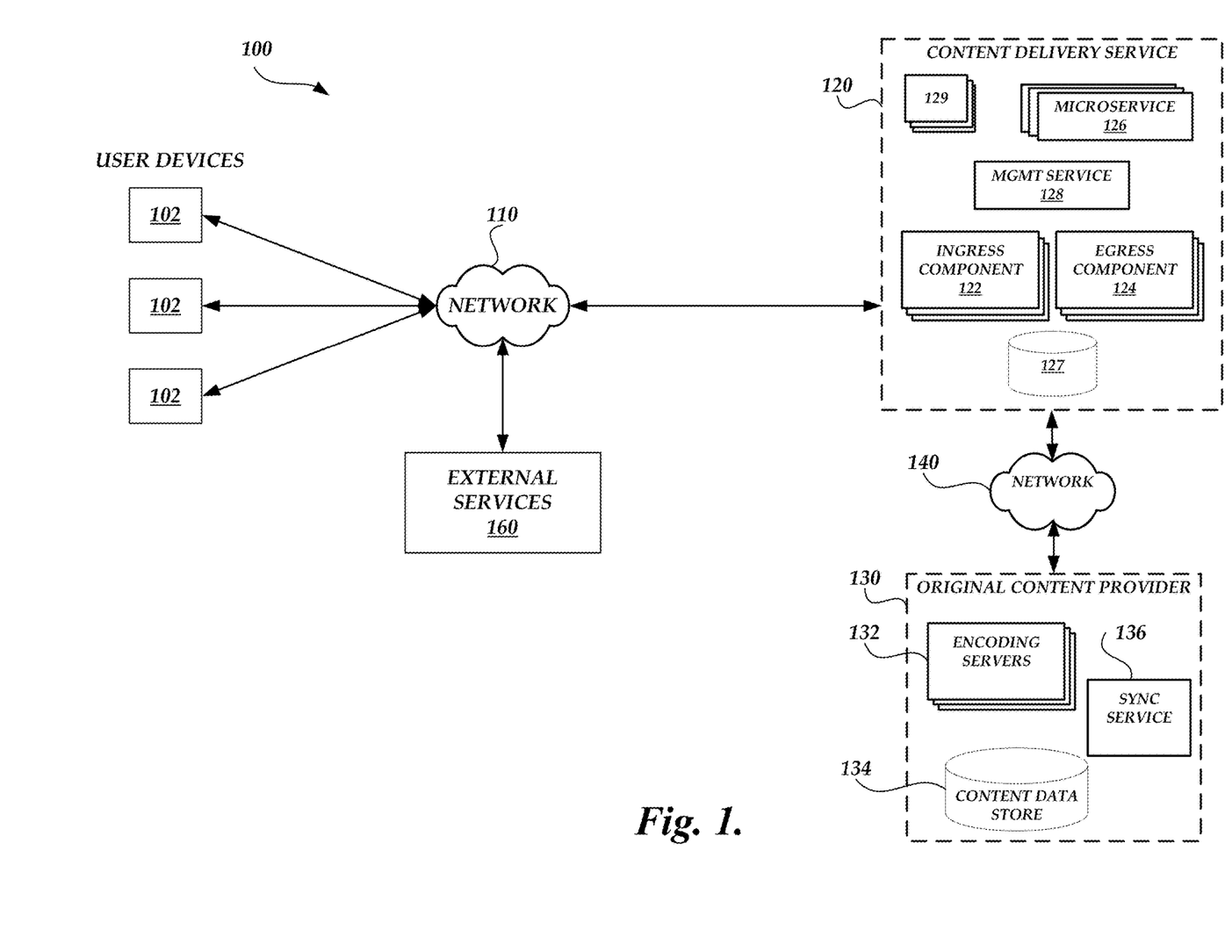
FIG. 1 is a block diagram of a content delivery environment that includes one or more user devices, a content delivery service, and an original content provider according to one embodiment.

FIG. 1 illustrates a content delivery environment 100 that uses micro-services for delivering created content from original content providers to user devices. The content delivery environment 100 includes a plurality of client devices 102 utilized by individual users, generally referred to as client computing devices, to request created content from a content delivery service 120. Illustratively, the content delivery service 120 indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), and the like. Based on consumer demand, a video packaging and origination service can also provide advanced video transmission features such as just-in-time packaging of video content, digital rights management ("DRM") encryption, time-shifting, bitrate selection, catch up TV, and more. Additionally, as will be described in greater detail below, the encoded content segments can be further processed in accordance with additional communication protocols, such as the common media application format ("CMAF"). The content can be illustratively provided by one or more origin sources, such as original content provider 130.

Client devices 102 may include any number of different computing devices capable of communicating with the networks 110 and 140, via a direct connection or via an intermediary. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance (e.g. a thermostat or refrigerator), controller, digital media player, watch, glasses, a home or car device, Internet of Thing ("IoT") devices, virtual reality or augmented reality devices, and the like. Each computer device 102 may optionally include one or more data stores (not shown in FIG. 1) including various applications or computer-executable instructions, such as web browsers or media player software applications, used to implement the embodiments disclosed herein. As will be explained in greater detail below, the applications can be configured to process encoded content segments organized according to fragments and chunks. Illustrative components of a client device 102 will be described with regard to FIG. 3.

Networks 110 and 140 may be any wired network, wireless network, or combination thereof. In addition, the networks 110 and 140 may be a personal area network, local area network, wide area network, cable network, fiber network, satellite network, cellular telephone network, data network, or combination thereof. In the example environment of FIG. 1, network 110 is a global area network (GAN), such as the Internet. Protocols and components for communicating via the other aforementioned types of communication networks are well known to those skilled in the art of computer communications and thus, need not be described in more detail herein. While each of the client computing devices 102 and content delivery service 120 are depicted as having a single connection to the network 110, individual components of the client computing devices 102 and content delivery service 120 may be connected to the network 140 at disparate points. Accordingly, communication times and capabilities may vary between the components of FIG. 1. Likewise, although FIG. 1 is illustrated as having two separate networks 110 and 140, one skilled in the relevant art will appreciate that the content delivery service 120 may utilize any number or combination of networks.

In accordance with embodiments, the content delivery service 120 includes one or more servers for receiving content from original content providers 130 and processing the content to make available a set of received encoded bitrate segments. As described in further detail below, the content delivery service 120 includes a plurality of encoding components 122 utilized to transmit encoded data streams to the user devices 102. The content delivery service 120 also includes one or more servers for generating encoded, processed content streams as described herein. The encoding components 122 may be distributed according to geographic criteria or availability zones to facilitate delivery or access to encoded content. Still further, although illustrated as separate components, the encoding components 122 may be integrated into a single component that functions as a combined ingress and egress component for receiving and transmitting encoded content from the content delivery service 120.

The content delivery service 120 can further include a delivery component 124 that represents a content distribution component or service that receives encoded content segments from the encoding content component 122 and distributes the encoded content for distribution to client devices 102. As described above, in one embodiment, the delivery component 124 includes a plurality of distribution endpoints located at various logical endpoints that function as distribution endpoints for different network clients. In this regard, the delivery component 124 includes additional components or a plurality of components that function as individual delivery endpoints. As further described above, the delivery component 124 can receive encoded content segment chunk data from the encoding components 122 as the content is being encoded. Such components can include a set of individual streaming components 129 that establish individualized channel requests from user computing devices 102 and streaming the requested content to the requesting devices.

The content delivery service 120 can also include management component 128 for managing the creation of content based on content requests received from the client device. The management component 128 illustratively manages the implementation of content creation workflows that facilitate dynamic content creation responsive to requests. The management component manages the creation of content by identifying a set of micro-services that can implement one or more tasks defined in a workflow or other definition of processing to respond to content requests. Illustratively, the micro-services can be implemented via one more computing components include physical computing devices, instantiated virtual machine instances, dynamic execution environments, or any additional computing environment that can receive an assigned task (defined in a workflow), execute the defined task and provide a corresponding processing result. Individual micro-services may be configured to generate the appropriate processing result responsive to the request. Additionally, the micro-services may able to receive configuration information (e.g., a level or type of encoding) as part of the invocation of the micro-service by the management component 128. Still further, in some embodiments, a micro-service 126 may correspond to containers or execution environments that are pre-warmed or pre-configured to receive executable code, execute the code and provide a response without requiring the pre-configuration of the container. In other embodiments, a single micro-service 126 may implement two or more tasks as required or defined in a workflow. As described herein, the set of micro-services can individually be instantiated to process multiple content requests in parallel to facilitate scaling. Still further, the set of micro-services 126 can be adjusted to implement different tasks as defined in a workflow or modified in a workflow.

Illustratively, the management component 128 can as part of the instantiation of a workflow define a start segment and a stop segment and controlling micro-services 126 to extract a start portion and stop portion. The management component also gathers the segments between the start segment and stop segment and merges the start portion, the stop portion, and segments between the start segment and stop segment. The management component also generates synchronization information utilized by the encoders, such as sequence numbers corresponding to the set of encoded segments, time stamp information related to a relative time of the encoded segments or from which relative time of encoded segments will be based, and the like. The content delivery service 120 can further include a data store 128 for maintaining generated encoded data for collection and transmission.

Still further, the content delivery environment 100 can include a set of external services 160 that can be configured to generate requests for content. For example, the external services 160 can include additional services that may be configured to automatically generate requests for content, such as a service that attempts to generate highlights of a streaming sporting event. In another example, the external services 160 can be a service that attempts to generate content requests automatically based on social media cues (e.g., commentary related to a streaming event that receives a threshold amount of commentary may trigger a request for a content segment). The set of external services 160 may be integrated as part of the logical grouping of the content delivery service 120 or represent stand-alone services configured to send content requests as described herein It will be appreciated by those skilled in the art that the content delivery service 120 may have fewer or greater components than are illustrated in FIG. 1. Thus, the depiction of the content delivery service 120 in FIG. 1 should be taken as illustrative. For example, in some embodiments, components of the content delivery service 120 may be executed by one more virtual machines implemented in a hosted computing environment. A hosted computing environment may include one or more rapidly provisioned and released computing resources, which computing resources may include computing, networking or storage devices. Additionally, while such components are illustrated as logically being logically grouped in FIG. 1, one skilled in the relevant art will appreciate that one or more aspects of the present application can include the content delivery service 120 as being implemented in multiple geographic areas. Additionally, not all geographic areas hosting portions of the content delivery service 120 will necessary have all the same components or combination of components.

With continued reference to FIG. 1, the content delivery environment 100 also includes original content providers 130. Illustratively, the original content provider can include a plurality of encoders 132 for generating multiple encoded streams for transmission to the content delivery service 120. In some embodiments, the original content provider the original content provider 130 can further include synchronization services 136 for generating synchronization information utilized by the encoders, such as sequence numbers corresponding to the set of encoded segments, time stamp information related to a relative time of the encoded segments or from which relative time of encoded segments will be based, and the like. The original content provider 130 can further include a data store 134 for maintaining encoded data for transmission.

Figure 2:
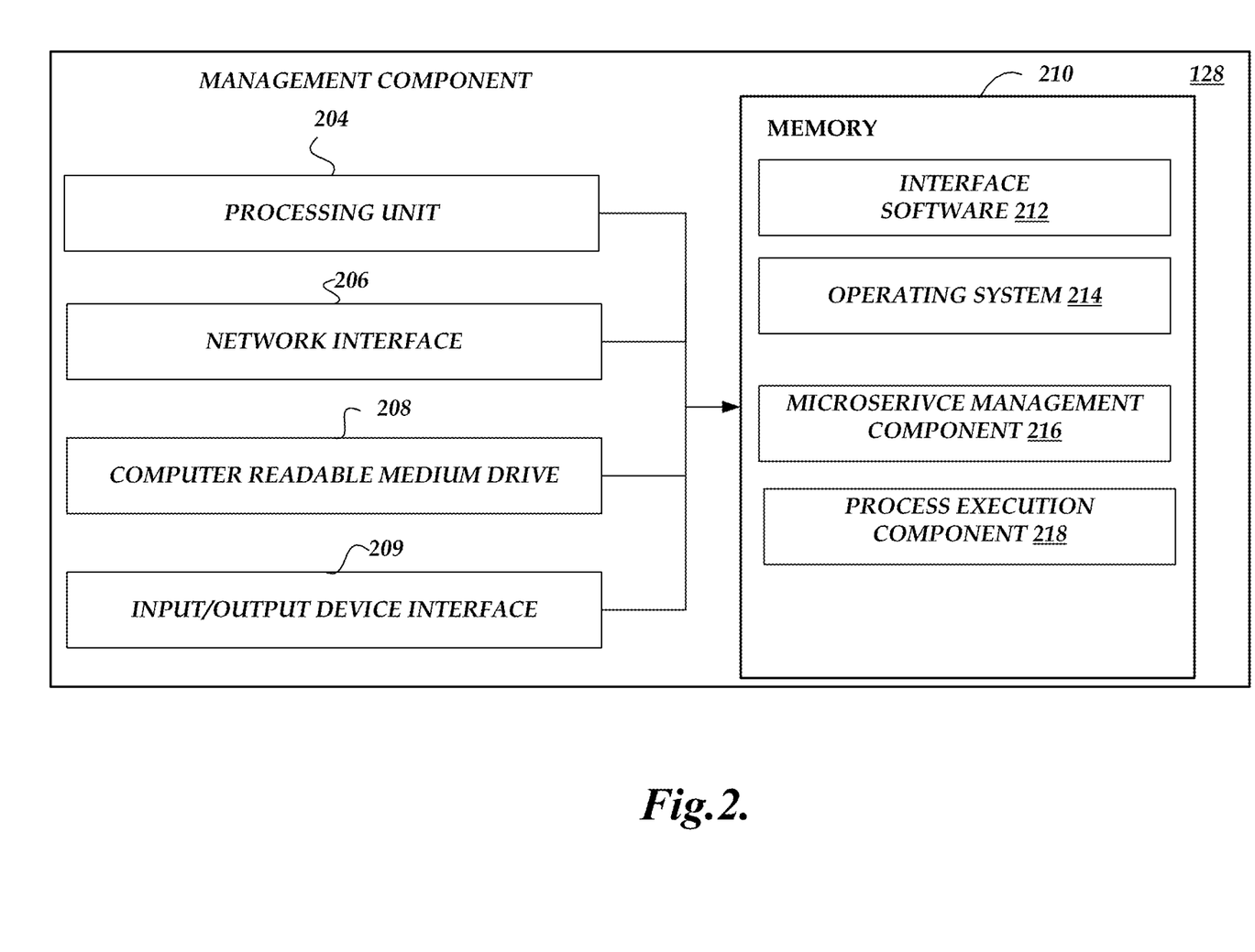
FIG. 2 is a block diagram of illustrative components of a user computing device configured to remotely process content in accordance with an illustrative embodiment.

FIG. 2 depicts one embodiment of an architecture of an illustrative server for functioning as a management component 128 as described herein. The general architecture of the management component 128 depicted in FIG. 2 includes an arrangement of computer hardware and software components that may be used to implement aspects of the present disclosure. As illustrated, the management component 128 includes a processing unit 202, a network interface 204, a computer readable medium drive 206, an input/output device interface 208, all of which may communicate with one another by way of a communication bus. The components of the management component 128 may be physical hardware components or implemented in a virtualized environment.

The network interface 204 may provide connectivity to one or more networks or computing systems, such as the network 110 or network 140 of FIG. 1. The processing unit 202 may thus receive information and instructions from other computing systems or services via a network. The processing unit 202 may also communicate to and from memory 210 and further provide output information for an optional display via the input/output device interface 208. In some embodiments, the management component 128 may include more (or fewer) components than those shown in FIG. 3.

The memory 210 may include computer program instructions that the processing unit 202 executes in order to implement one or more embodiments. The memory 210 generally includes RAM, ROM, or other persistent or non-transitory memory. The memory 210 may store an operating system 312 that provides computer program instructions for use by the processing unit 202 in the general administration and operation of the management component 128. The memory 210 may further include computer program instructions and other information for implementing aspects of the present disclosure. For example, in one embodiment, the memory 210 includes interface software 212 for receiving and processing content requests from requesting entities. Additionally, the memory 210 includes a micro-service management component 216 for managing various micro-services which can perform one or more of extract portions of content segments, gathering content segments, and merging portions of content segments and content segments. Additionally, the management component 128 can further include a process execution component 218 that can process the content requests by identifying the correct start segment and start segment and communicating with the micro-service management component to facilitate the processing of the content requests. Additionally, the process execution component 218 may be implemented as a stand-alone application in the content delivery service 120.

Figure 3:
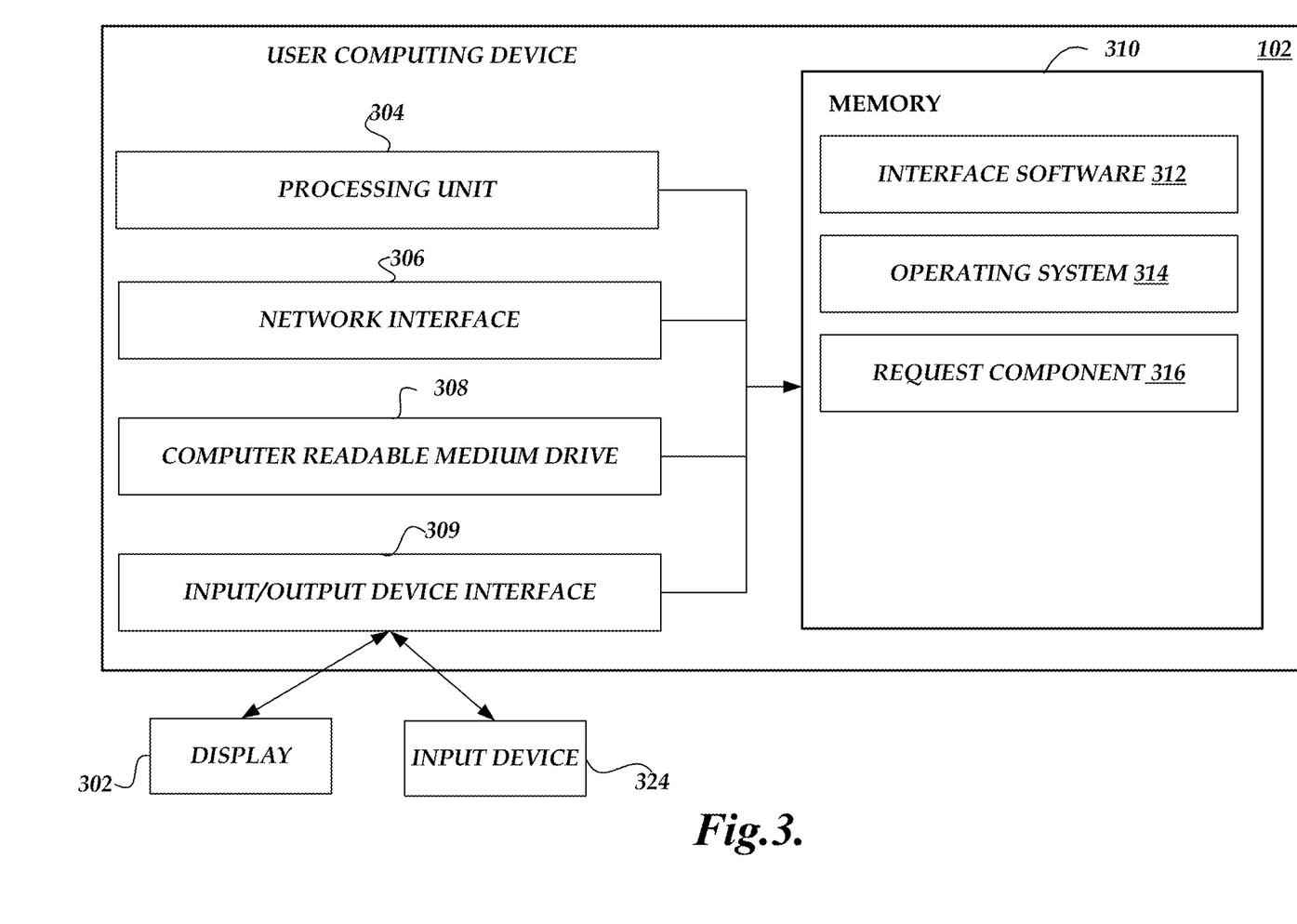
FIG. 3 is a block diagram of illustrative components of a management component configured to manage one or more micro-services in creating and transmitting content to requesting entities in accordance with an illustrative embodiment.

FIG. 3 depicts one embodiment of an architecture of an illustrative user computing device 102 that can generate content requests and process encoded content in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 304, a network interface 306, a computer readable medium drive 308, an input/output device interface 309, an optional display 302, and an input device 324, all of which may communicate with one another by way of a communication bus.

The network interface 306 may provide connectivity to one or more networks or computing systems, such as the network 110 of FIG. 1 and the content delivery service 120 or the original content provider 130. The processing unit 304 may thus receive information and instructions from other computing systems or services via a network. The processing unit 304 may also communicate to and from memory 310 and further provide output information for an optional display 302 via the input/output device interface 309. The input/output device interface 309 may also accept input from the optional input device 324, such as a keyboard, mouse, digital pen, etc. In some embodiments, the user computing device 302 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store interface software 312 and an operating system 314 that provides computer program instructions for use by the processing unit 304 in the general administration and operation of the user computing device 102. The memory 310 may further include computer program instructions and other information for implementing aspects of the present disclosure. For example, in one embodiment, the memory 310 includes a request component 316, such as browser application or media player, for accessing content and communicating with the content delivery service 120. Additionally, in some embodiments, the memory 310 can include a request component 316 for requesting created content and receiving created content from the content delivery service 120.

Figure 4A:
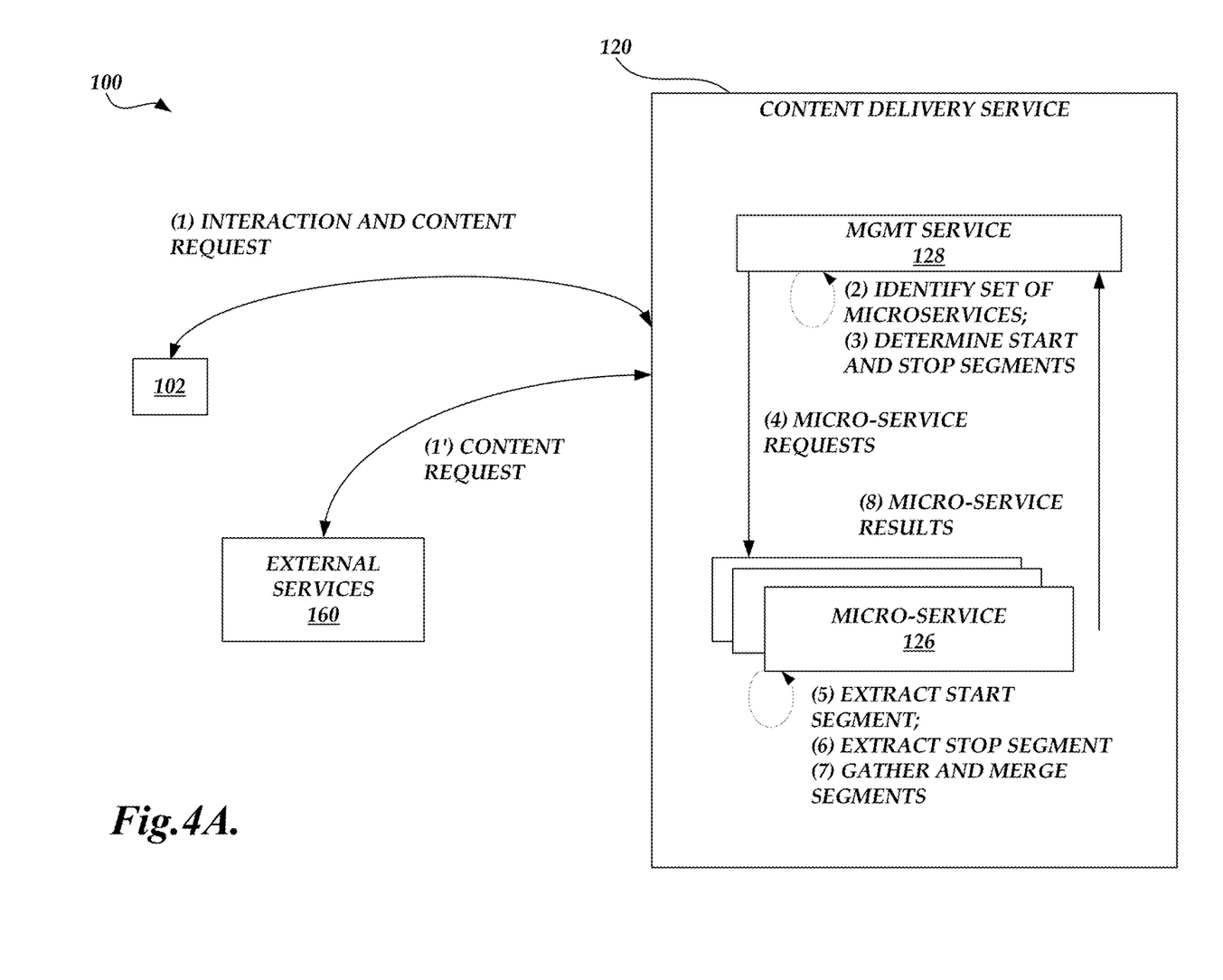
FIG. 4A is a block diagram illustrative of the content delivery environment of FIG. 1 illustrating the interaction between a requesting device, a content management service, a set of micro-service providers, and an original content provider in accordance with an illustrative embodiment.
Figure 4B:
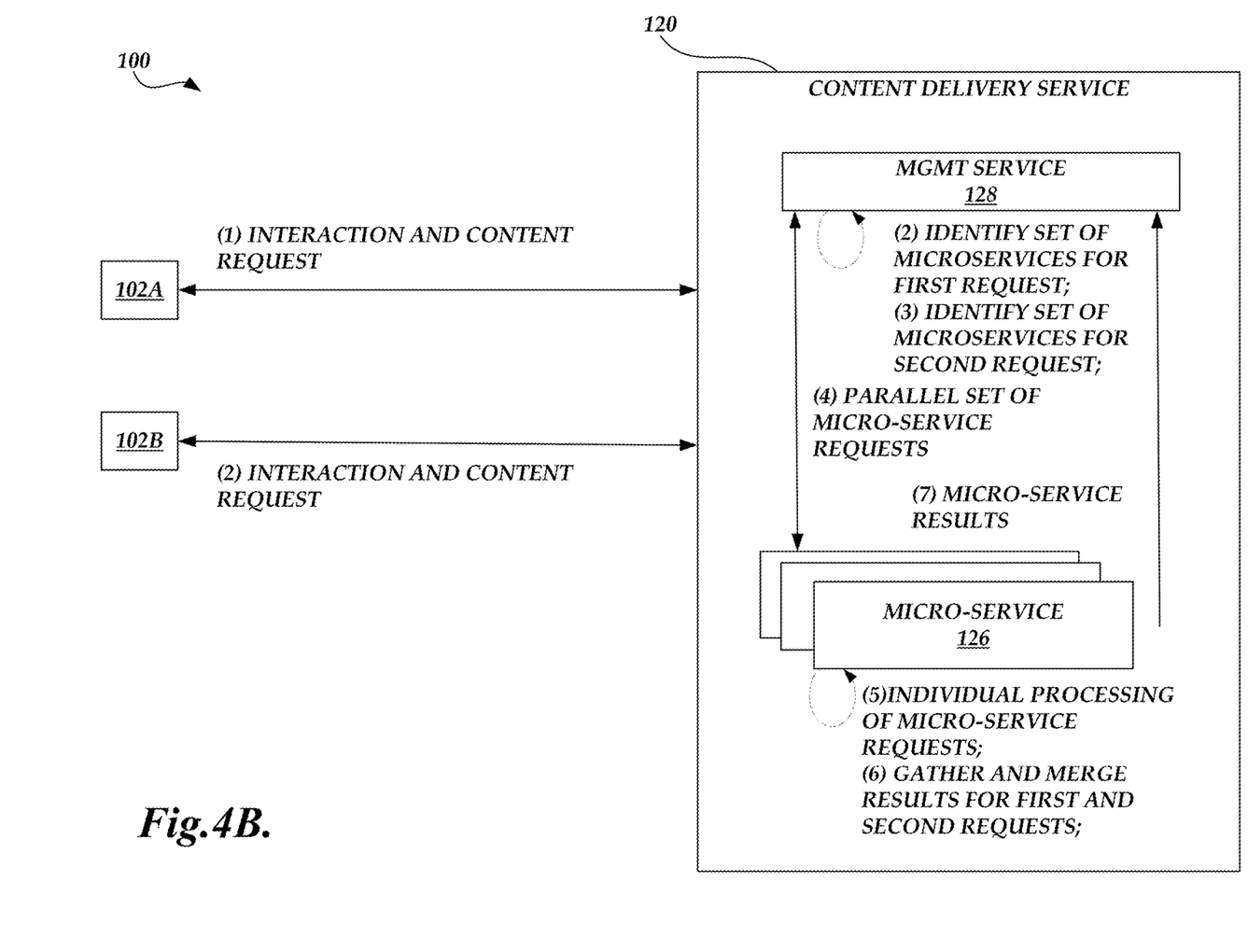
FIG. 4B is a block diagram illustrative of the content delivery environment of FIG. 1 illustrating the interaction between a set of requesting devices, a content management service, a set of micro-service providers, and an original content provider in accordance with an illustrative embodiment.

FIGS. 4A and 4B are illustrative of interactions for micro-service based content creating. With reference first to FIG. 4A, at (1), the management service 128 receives a content request. Illustratively, in some embodiments, the content request may be received from a user device 102. The request can be specified in a variety of ways, such as by name, author, content provider, search terms, and the like. In other embodiments, individual user devices 102 may be associated with profiles in which the content has already been identified, such as a wishlist, historical access information, and the like. The content requests can also be associated with performance parameters, such as a service level agreement ("SLA") or financial criteria. In some embodiments, portions of the information of the requests can received from external sources, such as a profile. As also depicted in FIG. 4A, one or more content requests can come from an external service 160, such as via an API or other interface. As discussed above, the content requests from the external services 160 may be automated such as via a service configured to automatically generate content clips or highlights based on streaming content.

Illustratively, the management service 128 has access to the requested content based on previous streaming actions. If the content delivery service 120 may require communication with the original content provider 130 to retrieve the content based on the content information. While illustratively, video content is used, the content request can also be for any other content such as audio and images. The management service 128 can communicate with the original content provider through a network 140 as shown in FIG. 1. Alternatively, the management service 128 can be directly connected with the original content provider 130 or the original content provider 130 can be implemented within the content delivery service 120.

At (2), the content delivery service 120 will implement an established workflow or process for identifying the set of micro-services that will implement one or more tasks defined in the workflow or process. The workflow can illustratively specify content creation based on a type of content, content publisher, user, or other selection criteria. The workflow can specify configuration information for individual micro-services including performance parameters, financial criteria, security parameters, and the like. The workflows may be preconfigured or dynamically modified such as through an API. Still further, the workflows may be updated based on performance metrics of the content delivery service. For example, the content delivery service 120 may utilize performance criteria in the workflow and performance criteria associated with the content request to select from one or more available micro-services that can be utilized to provide the requested processing in a manner to meet or exceed the performance criteria.

To being the implementation of workflow, the management service illustratively inspects the content based on the start time and the stop time. At (3), the management service 128 determines which segment is the start segment based on the start time and the stop segment based on the stop time. The content request can alternatively be embedded with the proper start segment and start segment or the management service 128 can obtain the proper start segment and stop segment. As described above, the start time associated with the start segment or the stop time associated with the stop segment may not directly align with the beginning of a previously encoded segment of the streamed content. In accordance with some streaming content segments, however, an individual content segment (e.g., a six second segment) is made up of a number of frames of data. The beginning portion of a content segment includes a reference frame that provides reference information for the remaining frames. For example, in accordance with the H.264 protocol, the first frame of data includes an instantaneous decoder refresh ("IDR") frame from which all the remaining frames of the segments reference. Accordingly, if the requested time for either the start or stop time falls within a segment, the management component 128 must cause a processing of the previously encoded segment to create a new segment that will include the reference information that would otherwise be omitted. Such a process will be generally referred to as extracting the start or stop segment. If the requested start time or stop time aligns with the start of segment, the extraction process can be accomplished with the previously encoded content segments.

At (4), the management component 128 interacts with a set of micro-services. At this step, the management component 128 chooses a set of micro-services capable of extracting the start portion out of the start segment. The start portion is defined as the portion of the start segment that starts at the start time and ends at the end of the segment. Further, at this step, the management component 128 chooses a set of micro-services capable of extracting the stop portion out of the stop segment. As previously described, the selection of the micro-services can be based on configuration information or performance information defined in the workflow, content requests, or combination thereof. For example, the content request can specify SLA criteria related to quality, performance, error rates, etc. that will be used by the management component 128 to select from available micro-services that are configured to implement a task as configured (e.g., a particular type of encoding) or that can implement the task in accordance with the defined performance/cost criteria. In other embodiments, the management component 128 can attempt to reuse specific micro-services that have previously processed a related task, which can further reduce the processing time or consumption of resources.

At (5), the management component 128 causes a micro-service out of the set of micro-services capable of extracting the start portion out of the start segment to extract the start portion out of the start segment. Further, the management component 128 causes a micro-service out of the set of micro-services capable of extracting the stop portion out of the stop segment to extract the stop portion out of the stop segment. The stop portion is defined as the portion of the stop segment that starts at the beginning and ends at the stop time. If the set of micro-services capable of performing a task includes two or more micro-services, the management component can choose an individual micro-service based on a set of criteria in the two or more micro-services. Those criteria include but are limited to resources, cost, transmission time, processing power, and energy consumption.

Also, the management component 128 gathers the segments between the start segment and stop segment. The management component 128 can gather these segments within itself. Alternatively, the management component 128 can identify a set of micro-services capable of gathering the segments between the start segment and the stop segment. The management component 128 can decide on a single micro-service to gather the segments between the start segment and the stop segment and then execute the micro-service.

Also, the management component 128 merges the start portion, the stop portion, and the segments between the start segment and the stop segment. The management component 128 can merge these segments within itself. Alternatively, the management component 128 can identify a set of micro-services capable of merging the start portion, the stop portion, and the segments between the start segment and the stop segment. The management component 128 can decide on a single micro-service to merge the start portion, the stop portion, and the segments between the start segment and the stop segment and then execute the micro-service. The sequence of merging is the start portion and then the segments between the start segment and the stop segment and finally the stop portion.

Illustratively, if the start segment and stop segment are the same segment because the start time and stop time of the content request all fall within one segment, then the micro-services would only identify a single micro-service that extracts a portion that includes from the start time to the stop time of the one segment.

At (6) the micro-services 126 can interact with the original content source 140 to obtain the proper content based on the content information when performing the extraction of the start portion and stop portion and gathering segments between the start segment and stop segment. Alternatively, the micro-services 126 can also interact with the management service 128 which interacts with the original content source 140 to gather the proper content. The management service 128 can send the micro-services 126 the proper content. At (7), the results of the micro-service processing are provided to the management component 128

It is further understood that the content delivery service 120 can perform a portion of the tasks that the content delivery service 120 causes the micro-services 126 to perform rather than identifying relevant micro-services 126 to perform the task. Alternatively, the content delivery service 120 can decide whether the micro-services 126 perform the tasks or whether the content delivery service 120 performs the tasks depending on the resource levels of the content delivery service 120 relative to the micro-services 126.

Further, the management component 128 can iteratively, in sequence or parallel, take in content creation requests and process the content creation requests in the steps described above in order to create content.

With reference now to FIG. 4B, an embodiment illustrating the processing of multiple content requests will be described. At (1), the management service 128 receives a content request. As shown in FIG. 4B, content request may be received from a first user device 102A and a second user device 102B. The request can be specified in a variety of ways, such as by name, author, content provider, search terms, and the like. In other embodiments, individual user devices 102A or 102B may be associated with profiles in which the content has already been identified, such as a wishlist, historical access information, and the like. The content requests can also be associated with performance parameters, such as a service level agreement ("SLA") or financial criteria. In some embodiments, portions of the information of the requests can received from external sources, such as a profile. Although the content requests are illustrated as originating from two user devices 102A and 102B, the multiple content requests may be transmitted from external services 160.

At (2), the content delivery service 120 will implement an established workflow or process for identifying the set of micro-services that will implement one or more tasks defined in the workflow or process for the first content request. At (3), the content delivery service 120 will implement an established workflow or process for identifying the set of micro-services that will implement one or more tasks defined in the workflow or process for the second content request. The workflows can illustratively specify content creation based on a type of content, content publisher, user, or other selection criteria. The workflows can specify configuration information for individual micro-services including performance parameters, financial criteria, security parameters, and the like. The workflows may be preconfigured or dynamically modified such as through an API. Still further, the workflows may be updated based on performance metrics of the content delivery service. For example, the content delivery service 120 may utilize performance criteria in the workflow and performance criteria associated with the content request to select from one or more available micro-services that can be utilized to provide the requested processing in a manner to meet or exceed the performance criteria. The workflows for the first and second content request may be the same workflow and configurations or be different workflows.

As described above, the management service illustratively inspects the content based on the start time and the stop time. The management service 128 determines which segment is the start segment based on the start time and the stop segment based on the stop time. The content request can alternatively be embedded with the proper start segment and start segment or the management service 128 can obtain the proper start segment and stop segment. As described above, the start time associated with the start segment or the stop time associated with the stop segment may not directly align with the beginning of a previously encoded segment of the streamed content. In accordance with some streaming content segments, however, an individual content segment (e.g., a six second segment) is made up of a number of frames of data. The beginning portion of a content segment includes a reference frame that provides reference information for the remaining frames. For example, in accordance with the H.264 protocol, the first frame of data includes an instantaneous decoder refresh ("IDR") frame from which all the remaining frames of the segments reference. Accordingly, if the requested time for either the start or stop time falls within a segment, the management component 128 must cause a processing of the previously encoded segment to create a new segment that will include the reference information that would otherwise be omitted. Such a process will be generally referred to as extracting the start or stop segment. If the requested start time or stop time aligns with the start of segment, the extraction process can be accomplished with the previously encoded content segments.

At (4), the management component 128 interacts with a set of micro-services in parallel for the both first and second content request workflows. At this step, the management component 128 chooses a set of micro-services capable of extracting the start portion out of the start segment for the first and second content requests. In some embodiments, a single micro-service may be utilized to process both content requests. In other embodiments, different micro-services may be utilized.

Further, at this step, the management component 128 chooses a set of micro-services capable of extracting the stop portion out of the stop segment for the first and second content requests. As previously described, the selection of the micro-services can be based on configuration information or performance information defined in the workflow, content requests, or combination thereof. For example, the content request can specify SLA criteria related to quality, performance, error rates, etc. that will be used by the management component 128 to select from available micro-services that are configured to implement a task as configured (e.g., a particular type of encoding) or that can implement the task in accordance with the defined performance/cost criteria. In other embodiments, the management component 128 can attempt to reuse specific micro-services that have previously processed a related task, which can further reduce the processing time or consumption of resources.

The management component 128 causes a micro-service out of the set of micro-services capable of extracting the start portion out of the start segment to extract the start portion out of the start segment. Further, the management component 128 causes a micro-service out of the set of micro-services capable of extracting the stop portion out of the stop segment to extract the stop portion out of the stop segment. The stop portion is defined as the portion of the stop segment that starts at the beginning and ends at the stop time. If the set of micro-services capable of performing a task includes two or more micro-services, the management component can choose an individual micro-service based on a set of criteria in the two or more micro-services. Those criteria include but are limited to resources, cost, transmission time, processing power, and energy consumption.

At (6), the management component 128 gathers the segments between the start segment and stop segment. The management component 128 can gather these segments within itself. Alternatively, the management component 128 can identify a set of micro-services capable of gathering the segments between the start segment and the stop segment. The management component 128 can decide on a single micro-service to gather the segments between the start segment and the stop segment and then execute the micro-service.

The management component 128 merges the start portion, the stop portion, and the segments between the start segment and the stop segment. The management component 128 can merge these segments within itself. Alternatively, the management component 128 can identify a set of micro-services capable of merging the start portion, the stop portion, and the segments between the start segment and the stop segment. The management component 128 can decide on a single micro-service to merge the start portion, the stop portion, and the segments between the start segment and the stop segment and then execute the micro-service. The sequence of merging is the start portion and then the segments between the start segment and the stop segment and finally the stop portion.

Illustratively, if the start segment and stop segment are the same segment because the start time and stop time of the content request all fall within one segment, then the micro-services would only identify a single micro-service that extracts a portion that includes from the start time to the stop time of the one segment.

At (6) the micro-services 126 can interact with the original content source 140 to obtain the proper content based on the content information when performing the extraction of the start portion and stop portion and gathering segments between the start segment and stop segment. Alternatively, the micro-services 126 can also interact with the management service 128 which interacts with the original content source 140 to gather the proper content. The management service 128 can send the micro-services 126 the proper content. At (7), the results of the micro-service processing are provided to the management component 128

Figure 5:
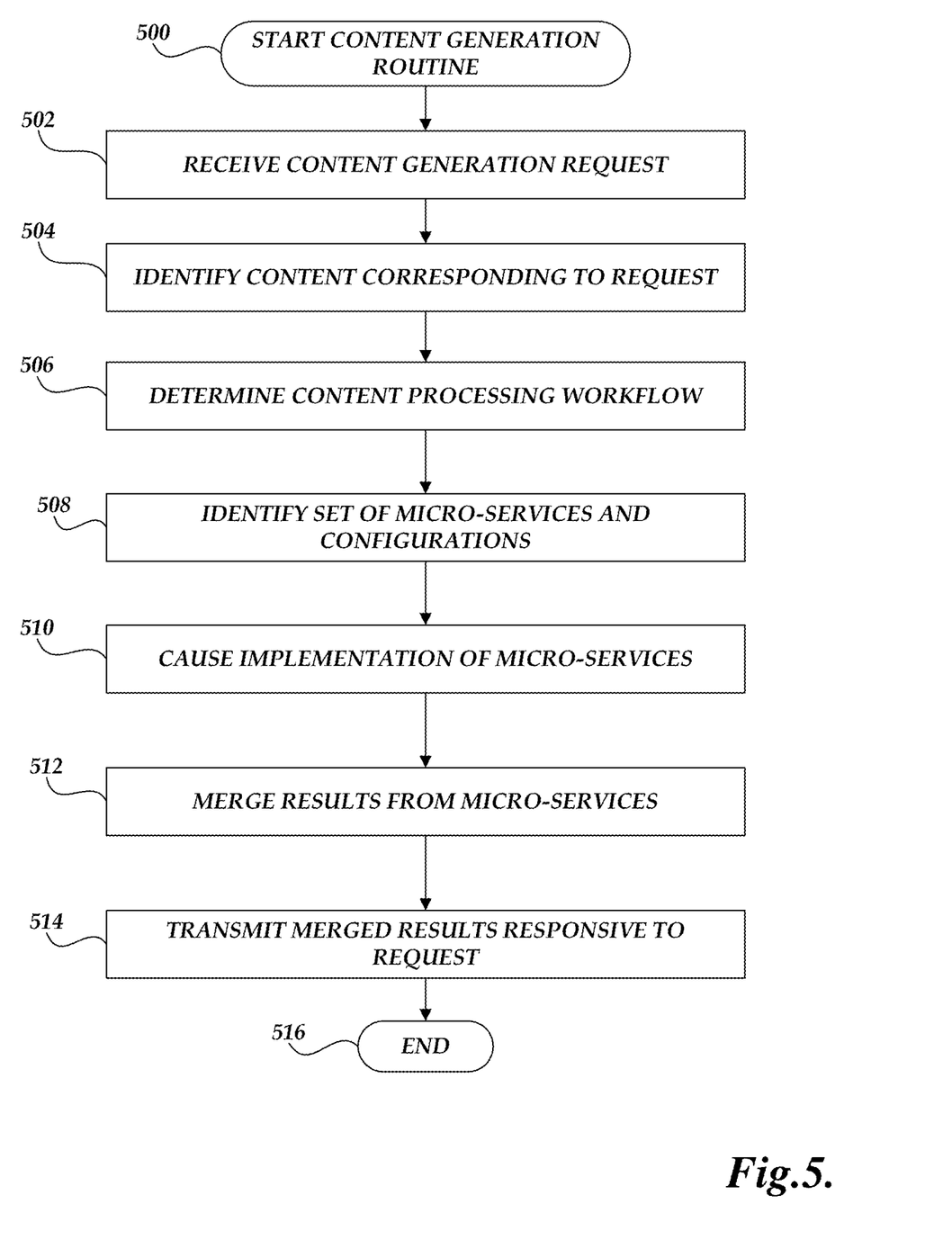
FIG. 5 is a flow diagram illustrative of a content creating and delivery routine implemented by a content delivery service in accordance with an aspect of the present application.

FIG. 5 is a flow diagram of a content delivery generation routine 500.

Illustratively, the routine 500 can be implemented after the user device 102, such as through the request component 316, transmits one or more requests for created content. The request for created content includes content information, a start time, and a stop time. Illustratively, the created content delivery routine 500 will be described through fulfillment of one request but it is understood that multiple requests can be fulfilled in sequence or parallel by repeating the routine. The content request can be transmitted through a network 110 to the content delivery service 120.

At block 502, the content delivery service 120 receives the request for creating content. The request for created content can be routed to the management component 128. As described above, the management service 128 can communicate with the original content provider through a network 140 as shown in FIG. 1. Alternatively, the management service 128 can be directly connected with the original content provider 130 or the original content provider 130 can be implemented within the content delivery service 120. The request can be specified in a variety of ways, such as by name, author, content provider, search terms, and the like. In other embodiments, individual user devices 102 may be associated with profiles in which the content has already been identified, such as a wishlist, historical access information, and the like. As described above, the content request can also be transmitted from various external services 160, such as to cause the automatic creation of content clips.

At block 504, the content delivery service 120 identifies the content that corresponds to the content request information. The content delivery service 120 can communicate with the original content provider 130 in order to inspect the requested content. Illustratively, the identification of the content can correspond to the type of search criteria, such as search tools or indexed files. In other embodiments, the content delivery service 120 can implement recommendations or other forms of suggested content to facilitate selection or confirmation of the desired content. For example, the content delivery service 120 can utilize a recommendation service to prioritize a listing of potential content meeting the search criteria, such as in embodiments in which multiple content may be relevant.

At block 506, content delivery service 120 identifiers a workflow or process for identifying the set of micro-services that will implement one or more tasks defined in the workflow or process. The workflow can illustratively specify content creation based on a type of content, content publisher, user, or other selection criteria. The workflow can specify configuration information for individual micro-services including performance parameters, financial criteria, security parameters, and the like. The workflows may be preconfigured or dynamically modified such as through an API. Still further, the workflows may be updated based on performance metrics of the content delivery service.

At block 508, the content delivery service 120 identifies a set of micro-services capable of implementing the determined workflow and causes the implementation of the identified micro-services at block 510. As previously described, the selection of the micro-services can be based on configuration information or performance information defined in the workflow, content requests, or combination thereof. For example, the content request can specify SLA criteria related to quality, performance, error rates, etc. that will be used by the management component 128 to select from available micro-services that are configured to implement a task as configured (e.g., a particular type of encoding) or that can implement the task in accordance with the defined performance/cost criteria. In other embodiments, the management component 128 can attempt to reuse specific micro-services that have previously processed a related task, which can further reduce the processing time or consumption of resources.

In one aspect, the micro-services can be used to determine a start segment which a start time falls into in the content. The content delivery service 120 inspects the requested content and identifies the segment that includes the content at the start time. For example, if a user requests a certain video file and requests a start time of 01:02:03, the content delivery service 120 can find the corresponding segment that includes the start time of 01:02:03. The micro-services can be further used to extract a start portion of the start segment which includes the start time of the start segment to the end of the start segment. For the start time example above, if the start segment runs from 01:02:02 to 01:02:08 then the start portion would be from the start time, 01:02:03 to the end of the segment, 01:02:08. As described above, the start time associated with the start segment or the stop time associated with the stop segment may not directly align with the beginning of a previously encoded segment of the streamed content. In accordance with some streaming content segments, however, an individual content segment (e.g., a six second segment) is made up of a number of frames of data. The beginning portion of a content segment includes a reference frame that provides reference information for the remaining frames. For example, in accordance with the H.264 protocol, the first frame of data includes an instantaneous decoder refresh ("IDR") frame from which all the remaining frames of the segments reference. Accordingly, if the requested time for either the start or stop time falls within a segment, the management component 128 must cause a processing of the previously encoded segment to create a new segment that will include the reference information that would otherwise be omitted. Such a process will be generally referred to as extracting the start or stop segment. If the requested start time or stop time aligns with the start of segment, the extraction process can be accomplished with the previously encoded content segments.

In another embodiment the content delivery service 120 identifies micro-services for determining a stop segment which a stop time falls into in the content. The content delivery service 120 inspects the requested content and identifies the segment that includes the content at the stop time. For example, if a user requests a certain video file and requests a stop time of 01:22:04, the content delivery service 120 can find the corresponding segment that includes the stop time of 01:22:04. Additional identifies a set of micro-services capable of extracting a stop portion of the stop segment which includes the beginning of the stop segment to the stop time of the stop segment. For the stop time example above, if the stop segment runs from 01:22:00 to 01:22:06 then the stop portion would be from the beginning of the stop segment, 01:22:00 to the end of the stop segment, 01:22:04. Illustratively, if the start segment and stop segment are the same segment because the start time and stop time of the content request all fall within one segment, then the micro-services would only identify a single micro-service that extracts a portion that includes from the start time to the stop time of the one segment. Illustratively, if the set of micro-services capable of performing a task includes two or more micro-services, the content delivery service 120 can choose an individual micro-service based on one or more criteria in the two or more micro-services. Those criteria include but are limited to resources, cost, transmission time, processing power, and energy consumption.

In still another aspect, the content delivery service 120 identifies a set of micro-services capable of gathering all the segments in-between the start portion and stop portion. Alternatively, the content delivery service 120 can gather all the segments in-between the start portion and stop portion itself without using a micro-service. Still further, in yet other aspects, the content delivery service 120 causes a micro-service to gather the start portion, stop portion, and all the segments in-between the start segment and stop segment. If the set of micro-services includes two or more micro-services, the content delivery service can choose the micro-service based on one or more criteria described above. Further, if the content delivery service 120 is unaware of certain criteria, the content delivery service can cause multiple micro-services to perform the service. For example, if there are two micro-services which appear to perform the same service and the content delivery service 120 unsure of certain criteria for selecting between the two micro-services, the content delivery service 120 can cause both the micro-services to perform the task and then select the result that happened the fastest or evaluate which one performed the task at a higher quality.

At block 512, the content delivery service 120 causes a micro-service to merge the gathered start portion, stop portion, and in-between segments. If the set of micro-services includes two or more micro-services, the content delivery service can choose the micro-service based on one or more criteria described above. The sequence for merging these portions would be the start portion followed by the in-between segments and ending with the stop portion.

At block 514, the content delivery service 120 transmits the merged segments to one or more client devices 102. In order to transmit to one or more client devices 102, the content delivery service 120 will use one or more encoders 132 to encode the merged segments into a suitable output video stream. This video stream is transmitted to the one or more client devices. The content delivery service 120 can iteratively, in sequence or parallel, take in content creation requests and process the content creation requests in the steps described above in order to create content. Routine 500 terminates at block 516.

Alternatively, it is understood that the content delivery service 120 can perform a portion of the tasks that the content delivery service 120 causes the micro-services 126 to perform rather than identifying relevant micro-services 126 to perform the task. Alternatively, the content delivery service 120 can decide whether the micro-services 126 perform the tasks or whether the content delivery service 120 performs the tasks depending on the resource levels of the content delivery service 120 relative to the micro-services 126.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description.

All changes which come within the meaning and range of equivalency of the claims are to be embraced within their scope.

What is claimed is:

1. A system for content delivery, the system comprising:
one or more user computing devices, wherein individual user computing devices of the one or more user computing devices include a processor and memory that execute computer-executable instructions that cause the individual user computing devices to transmit content requests, wherein the content requests correspond to streaming content provided by a content delivery service, and wherein individual content requests include a content identifier, a start time, and a stop time;
one or more computing devices associated with a processor and memory for executing computer-executable instructions for implementing a management service, wherein the management service is configured to:
receive content requests from the one or more user computing devices;
identify content request workflows, start segments, and stop segments based at least in part on information associated with the content requests, each content request workflow defining one or more tasks, each content request workflow identifying sets of micro-services to implement the one or more tasks;
from a content request workflow, independently identify a set of micro-services capable of extracting a start portion;
select a first micro-service from the identified set of micro-services capable of extracting the start portion based on criteria of each micro-service of the set of micro-services capable of extracting the start portion;
cause the first micro-service to independently extract a start portion based on the start time and the start segment;
from the content request workflow, independently identify a set of micro-services capable of extracting a stop portion;
select a second micro-service from the identified set of micro-services capable of extracting the stop portion based on criteria of each micro-service of the set of micro-services capable of extracting the stop portion;
cause the second micro-service to extract, independent of the first micro-service, a stop portion based on the stop time and the stop segment;
gather the segments between the start segment and the stop segment;
merge the start portion, the stop portion, and the gathered segments between the start segment and stop segment into a created content; and
transmit the created content to the one or more user computing devices.

2. The system of claim 1, wherein the request management service is further configured to, from the content request workflow, identify a third micro-service capable of independently gathering the segments between the start segment and the stop segment and cause the third micro-service to independently gather the segments between the start segment and stop segment.

3. The system of claim 2, wherein the request management service is further configured to, from the content request workflow, identify a fourth micro-service capable of independently merging the start portion, stop portion, and the segments between the start segment and stop segment and cause the fourth micro-service to merge the start portion, stop portion, and the segments between the start segment and stop segment.

4. The system of claim 1, wherein the transmitting further comprises encoding the created content.

5. A method for content delivery, the method comprising:
receiving a first content request including content request information, the content request information associated with streamed content;
identifying sets of micro-services configured to implement a content generation workflow, wherein the content generation workflow defines distinct tasks to generate content responsive to the content request, wherein identifying the sets of micro-services configured to implement the content generation workflow includes identifying individual sets of micro-services to implement individual distinct tasks, the identified sets of individual micro-services including:
a first set of micro-services selected to extract a start portion of the requested content from the streamed content, and
a second set of micro-services selected to extract a stop portion of the requested content from the streamed content, wherein at least the first and second sets of micro-services are selected individually selected based on the content generation workflow;
identifying a micro-service of the first set of micro-services based on criteria of each micro-service of the first set of micro-services, wherein the identified micro-service of the first set of micro-services is independently configured to extract the start portion of the requested content from the streamed content;
causing the identified micro-service of the first set of micro-services to extract a start portion from the streamed content;
identifying a micro-service of the second set of micro-services based on criteria of each micro-service of the second set of micro-services, wherein the identified micro-service of the second set of micro-services is independently configured to extract the stop portion of the requested content from the streamed content;
causing the identified micro-service of the second set of micro-services to extract a stop portion from the streamed content;
gathering the start portion, stop portion, and all the segments in-between the start segment and stop segment;
merging the gathered segments; and
generating a processing result corresponding to the merged segments.

6. The method of claim 5, wherein the gathering is performed by a third micro-service capable of gathering the start portion, the stop portion, and all the segments in-between the start segment and stop segment.

7. The method of claim 6, wherein the merging is performed by a fourth micro-service capable of independently merging the gathered segments.

8. The method of claim 5, wherein identifying the micro-service of the first set of micro-services based on the criteria of each micro-service of the first set of micro-services comprises identifying the micro-service of the first set of micro-services based on one or more of resources, cost, transmission time, processing power, and energy consumption of each micro-service of the first set of micro-services.

9. The method of claim 5, wherein identifying the micro-service of the second set of micro-services based on the criteria of each micro-service of the second set of microservices comprises identifying the micro-service of the second set of micro-services based on one or more of resources, cost, transmission time, processing power, and energy consumption of each micro-service of the second set of micro-services.

10. The method of claim 5, further comprising encoding the gathered segments into a format accessible by a requesting device.

11. The method of claim 5, wherein receiving the first content request including content request information includes receiving the first content request from a user device.

12. The method of claim 5, wherein receiving the first content request including content request information includes receiving the first content request from an automated service.

13. The method of claim 5, further comprising:
receiving a second content request including second content request information; and
identifying a set of micro-services configured to implement a second content generation workflow, wherein individual micro-services of the set of micro-services configured to implement the second content generation workflow are independently controllable.

14. The method of claim 13, further comprising causing a micro-service of the identified set of micro-services configured to implement the second content generation workflow to extract a start portion of the requested content from the streamed content substantially in parallel with causing the identified micro-service of the first set of micro-services to extract a start portion of the requested content from the streamed content for the first content request.

15. A method for content delivery, the method comprising:
receiving a content request, wherein the content request includes content information, a start time, and a stop time;
identifying a set of micro-services capable of processing the content request, and wherein individual micro-services of the set of micro-services are independently controllable,
causing the set of micro-services to independently extract a start portion, wherein causing the set of micro-services to independently extract a start portion includes independently identifying a micro-service that is capable of extracting a start portion from a start segment from the identified set of micro-services based on criteria of the micro-services capable of extracting the start portion, and wherein the start portion comprises the start time of the start segment to the end of the start segment;
causing the set of micro-services to independently extract a stop portion, wherein causing the set of micro-services to independently extract a stop portion includes independently identifying a micro-service that is capable of extracting a stop portion from a stop segment from the identified set of micro-services based on criteria of the micro-services capable of extracting the stop portion, and wherein the stop portion comprises the beginning of the stop segment to the stop time of the stop segment;
wherein causing the set of micro-services to independently extract the start portion occurs independently of causing the set of micro-service to extract the stop portion; and merging the stop portion, the start portion, and all segments in-between the start segment and stop segment.

16. The method of claim 15, further comprising identifying a micro-service capable of independently merging the stop portion, the start portion, and all the segments in-between the start segment and stop segment; wherein the merging the stop portion, the start portion, and all segments in-between the start segment and stop segment comprises causing the micro-service to merge the stop portion, the start portion, and all segments in-between the start segment and stop segment.

17. The method of claim 15, further comprising gathering the stop portion, the start portion, and all the segments in-between the start segment and stop segment, wherein the merging comprises merging the gathered stop portion, start portion, and the in-between segments.

18. The method of claim 17, further comprising identifying a micro-service capable of merging the gathered stop portion, start portion, and segments and causing the micro-service to merge the gathered stop portion, start portion, and segments.

19. The method of claim 15, wherein the set of micro-services comprises a first micro-service capable of independently extracting the start portion and a second micro-service capable of extracting the stop portion independent from the first micro-service.

20. The method of claim 19, wherein the causing the set of micro-services to independently extract a start portion comprises causing the first micro-service to independently extract the start portion.

21. The method of claim 19, wherein the causing the set of micro-services to independently extract a stop portion comprises causing the second micro-service to independently extract the stop portion.

22. The method of claim 15, wherein the set of micro-services comprises a single micro-service that is capable of extracting the start portion and capable of extracting the stop portion.

23. The method of claim 22, wherein causing the set of the micro-services to independently extract a start portion comprises causing the single micro-service to extract the start portion and causing the single micro-service to extract the stop portion.

24. The method of claim 15, further comprising updating the identified set of micro-services capable of processing the content request based on at least one of performance data or user input.

25. The method of claim 15, wherein at least one micro-service in the set of micro-services is implemented as one or more virtual machine instances configured to execute at least one of the extracting a start portion, extracting a stop portion, or merging the stop portion, the start portion, and all segments in-between the start segment and stop segment.

26. The method of claim 15, wherein at least one micro-service in the set of micro-services is implemented as a dynamic execution environment that receives executable code causing the dynamic execution environment to execute at least one of the extracting a start portion, extracting a stop portion, or merging the stop portion, the start portion, and all segments in-between the start segment and stop segment.

* * * * *

UNITED STATES PATENT AND TRADEMARK OFFICE
CERTIFICATE OF CORRECTION

PATENT NO. : 11,611,635 B1
APPLICATION NO. : 16/455612
DATED : March 21, 2023
INVENTOR(S) : Kristopher Kosmatka Page 1 of 1

It is certified that error appears in the above-identified patent and that said Letters Patent is hereby corrected as shown below:

In the Specification

In Column 5, Lines 13-14, delete "microservices" and insert --micro-services--.

In Column 9, Line 30, delete "herein" and insert --herein.--.

In Column 13, Line 54, delete "128" and insert --128.--.

In Column 16, Line 22, delete "128" and insert --128.--.

In the Claims

In Column 22, Claim 5, Line 25, delete "are selected" and insert --are--.

In Column 24, Claim 22, Line 38 (Approx.), before "micro-service", delete "single".

Signed and Sealed this
Twenty-seventh Day of June, 2023

Katherine Kelly Vidal
*Director of the United States Patent and Trademark Office*